United States Patent
Ji et al.

(10) Patent No.: US 6,190,436 B1
(45) Date of Patent: Feb. 20, 2001

(54) OZONE PURIFICATION PROCESS

(75) Inventors: Wenchang Ji, Chalfont, PA (US); Robert James Ferrell, Rutherford; Arthur I. Shirley, Piscataway, both of NJ (US)

(73) Assignee: The BOC Group, Inc., Murray Hill, NJ (US)

( * ) Notice: Under 35 U.S.C. 154(b), the term of this patent shall be extended for 0 days.

(21) Appl. No.: 09/263,615

(22) Filed: Mar. 5, 1999

(51) Int. Cl.[7] ................................................ B01D 53/22
(52) U.S. Cl. .......................... 95/45; 96/4; 422/186.08; 422/186.11; 422/186.12
(58) Field of Search .......................... 95/45, 47–55; 96/4, 7–14; 204/176; 422/186.07, 186.08, 186.11, 186.12

(56) References Cited

U.S. PATENT DOCUMENTS

| | | | |
|---|---|---|---|
| 2,966,235 | * 12/1960 | Kammermeyer | 95/51 |
| 3,274,750 | * 9/1966 | Robb | 95/45 |
| 3,369,343 | * 2/1968 | Robb | 95/51 X |
| 3,911,080 | * 10/1975 | Mehl et al. | 95/45 X |
| 4,430,306 | * 2/1984 | Namba et al. | 422/186.07 X |
| 4,717,407 | * 1/1988 | Choe et al. | 95/53 X |
| 4,929,357 | * 5/1990 | Schucker | 95/50 X |
| 5,051,113 | * 9/1991 | Nemser | 95/54 |
| 5,051,114 | * 9/1991 | Nemser et al. | 95/47 |
| 5,053,059 | * 10/1991 | Nemser | 95/54 |
| 5,147,417 | * 9/1992 | Nemser | 95/54 |
| 5,215,554 | * 6/1993 | Kramer et al. | 95/55 X |
| 5,236,673 | * 8/1993 | Coakley et al. | 422/186.07 |
| 5,288,304 | * 2/1994 | Koros et al. | 95/45 |
| 5,332,424 | * 7/1994 | Rao et al. | 95/49 X |
| 5,503,808 | * 4/1996 | Garbutt et al. | 422/186.07 X |
| 5,507,957 | * 4/1996 | Garrett et al. | 95/96 X |
| 5,520,887 | * 5/1996 | Shimizu et al. | 422/186.07 X |
| 5,656,246 | * 8/1997 | Patapoff et al. | 422/186.07 X |
| 5,679,133 | * 10/1997 | Moll et al. | 95/45 |
| 5,700,375 | * 12/1997 | Hagen et al. | 95/45 X |
| 5,756,054 | * 5/1998 | Wong et al. | 422/186.08 |

FOREIGN PATENT DOCUMENTS

| | | | |
|---|---|---|---|
| 63-248418 | * 10/1988 | (JP) | 95/45 |
| 4-284814 | * 10/1992 | (JP) | 95/50 |
| 7- 247102 | 9/1995 | (JP) . | |

OTHER PUBLICATIONS

Patent Abstracts of Japan vol. 1996, No. 01, Jan. 31, 1996 & JP 07 247102 A (Nippon Sanso KK), Sep. 26, 1995 *abstract*.

Shanbhag, Sirkar, "Ozone and Oxygen Permeation Behavior of Silicone Capillary Membranes Employed in Membrane Ozonators", Journal of Applied Polymer Science, vol. 69, No. 7, 1998, pp. 1263–1273.

Shanbhag et al., "Membrane–Based Ozonation of Organic Compounds", Ind. Eng. Chem. Res. 1998, 37, 4388–4398.

* cited by examiner

Primary Examiner—Robert H. Spitzer
(74) Attorney, Agent, or Firm—Philip H. Von Neida; Salvatore P. Pace

(57) ABSTRACT

An ozone-oxygen gas stream is introduced into feed side of a membrane separation unit containing an elastomeric polymer membrane. Ozone-enriched gas passes through the membrane to a permeate zone and is contacted with an ozone-reactive substance-containing gas stream in the permeate zone, thereby oxidizing the substances or is removed from the permeate zone. Removal of the ozone-enriched gas from the permeate zone may be effected by purging the permeate zone with an inert gas and/or evacuating the permeate zone. Ozone-enriched gas removed from the permeate zone may be mixed with a liquid or gas stream which contains ozone-reactive substances in, for example, a venturi device, thereby oxidizing the substances.

33 Claims, 1 Drawing Sheet

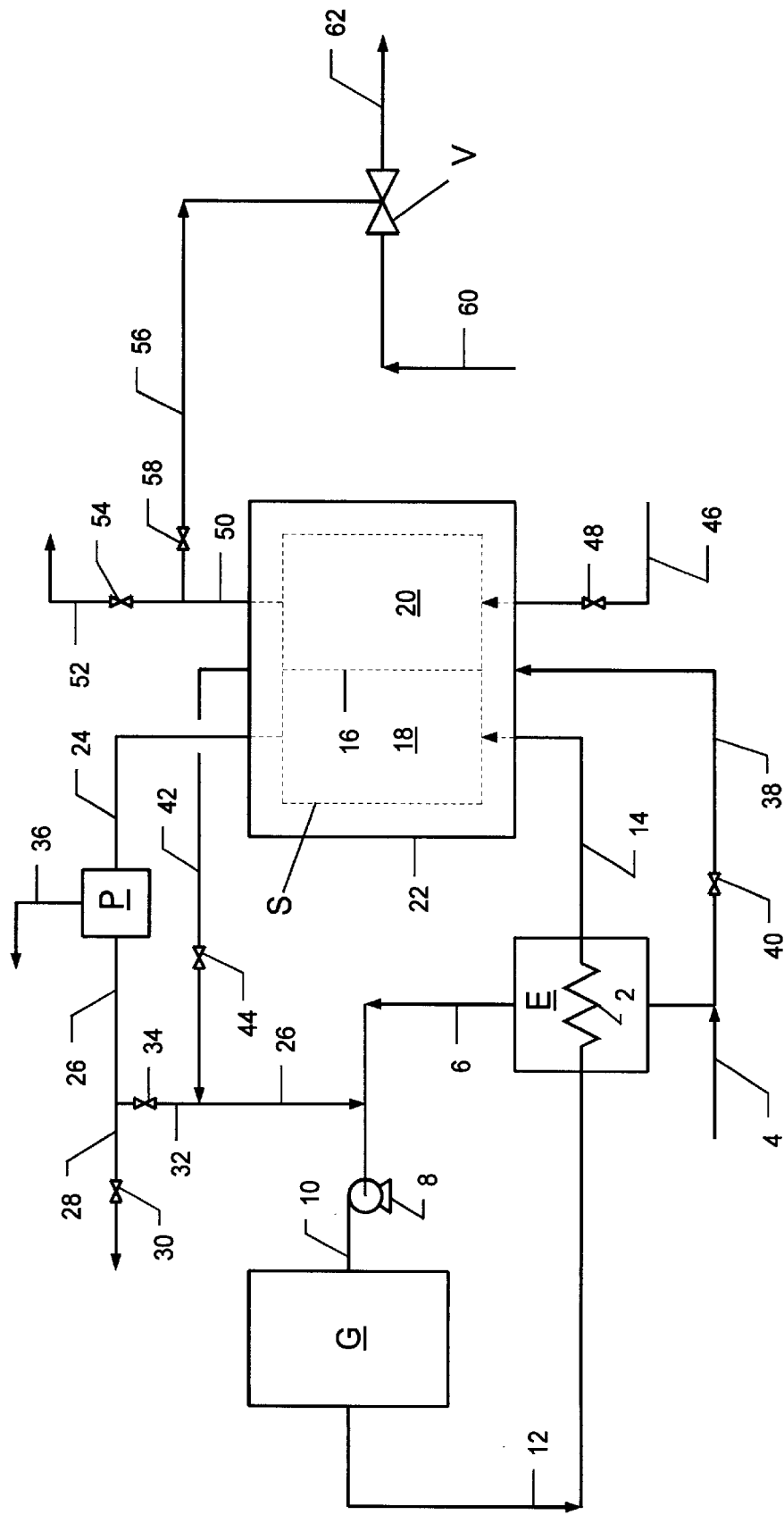

OZONE PURIFICATION PROCESS

FIELD OF THE INVENTION

This invention relates to the purification of ozone, and more particularly to the separation of ozone from oxygen by membranes. Specifically, the invention involves contacting a gaseous ozone-oxygen mixture with a membrane made from an elastomeric polymer and/or silica, thereby producing an ozone-enriched gas on the permeate side of the membrane.

BACKGROUND OF THE INVENTION

Ozone is generally produced on a commercial scale by subjecting substantially pure oxygen to a high voltage discharge, which causes some of the oxygen to be converted to ozone. Conventional ozone generators produce a product stream containing about 10% by weight ozone, which is satisfactory for many ozone applications. However, because the efficiency of some industrial ozone-based processes, such as waste water treatment and pulp and paper bleaching operations, is directly proportional to the concentration of ozone in the treatment gas fed to the processes, there is a demand for equipment that can produce ozone product gases which contain higher ozone concentrations than do currently available ozone gas products. In response to this demand, equipment manufacturers have made improvements in ozone generators which make it possible to make ozone product gas containing up to about 14% by weight ozone. However, the improved ozone generators are considerably more costly to operate than are earlier ozone generators, since the improved generators consume significantly more power than do the earlier generators.

Waste water treatment and paper and pulp plant operators would like to have available ozone generating equipment that can produce ozone gas products containing up to 20% by weight or more ozone, but equipment having such capability is not currently available. Furthermore, even if such equipment were available, it would be prohibitively expensive to operate because of the very high power consumption that would be required to produce ozone gas of this quality.

Because of the continuing need for product gas containing high concentrations of ozone, various techniques for increasing the ozone concentration of ozone-oxygen gas mixtures by separating ozone from oxygen have been considered. One procedure that has been investigated is distillation. Since ozone has a boiling point of about −112° C. and oxygen has a boiling point of about −190° C., distillation would appear to be an attractive method for separating these gases. U.S. Pat. No. 5,756,054 discloses an ozone generating system in which liquid oxygen from a cryogenic oxygen source is subjected to ozonization to produce an ozone-containing product gas, ozone is separated from the product gas by condensation and the gaseous oxygen fraction is recycled to the cryogenic oxygen source. A major drawback of this method of separation is that it is capital- and energy-intensive.

Another ozone-oxygen separation technique that has been explored is adsorption. Ozone is generally more strongly adsorbed by adsorbent materials than is oxygen and thus it can be readily separated from oxygen by adsorption-based processes. U.S. Pat. No. 5,507,957 discloses an ozone generating system in which oxygen is separated from air in an adsorption vessel and the separated oxygen is subjected to ozonization to produce an ozone-containing stream, which is recycled to the adsorption vessel. Ozone in the recycle stream is adsorbed by a preliminary bed of adsorbent and the oxygen contained in the recycle stream passes through the preliminary adsorbent and is recycled to the ozonizer. A problem associated with the use of adsorption for the separation of ozone and oxygen is that the sorbed ozone component cannot be recovered from the adsorption equipment until the adsorbent regeneration phase of the separation process. As was the case with distillation, it is difficult or impossible to recover the ozone product stream from the adsorption equipment without appreciable decomposition of the ozone. A further complication of ozone-oxygen adsorptive separation processes is the fact that some adsorbents actually catalyze the decomposition of ozone.

Membranes have been investigated for nondispersively introducing ozone into water streams from ozone-oxygen gas mixtures. Shanbhag et al., "Membrane-Based Ozonization of Organic Compounds", Ind. Eng. Chem. Res., vol. 37, 1998, pp. 4388–4398, describes the ozonation of water which contains organic pollutants by contacting a silicone membrane with an ozone-oxygen gas mixture. Ozone from the gas mixture passes through the membrane and contacts the pollutant-containing water on the permeate side of the membrane.

The present invention provides an efficient and effective method of increasing the ozone concentration of ozone-oxygen gas without significant loss of ozone by decomposition. This result is accomplished by separating an ozone-enriched gas stream from an ozone-oxygen gas mixture using a highly ozone-selective membrane manufactured from an elastomeric polymer or silica.

SUMMARY OF THE INVENTION

In a first broad embodiment, the invention comprises a process comprising the steps:

(a) introducing a gas mixture comprising ozone and oxygen into the feed zone of gas separation means comprising a feed zone and a permeate zone separated by an ozone-permeable membrane comprising an elastomeric polymer, silica or combinations thereof, thereby permeating an ozone-enriched gas into the permeate zone and producing an oxygen-enriched gas in the feed zone;

(b) removing the oxygen-enriched gas from the feed zone; and (c) removing ozone from the permeate zone.

Step (a) of the process is generally carried out at a temperature in the range of about −120 to about 100° C. and at a pressure in the range of about 0.8 to about 20 bara. Step (a) is preferably carried out at a temperature in the range of about −100 to about 0° C., and it is preferably carried out at a pressure in the range of about 0 to about 10 bara. Step (a) is more preferably carried out at a temperature in the range of about −80 to about −30° C., and it is more preferably carried out at a pressure in the range of about 1.5 to about 5 bara.

Preferred elastomeric polymers used in the process of the invention comprise silicone-based polymers, such as silicone rubber (polydimethylsiloxane); ethylene-propylene terpolymer; fluorocarbon elastomer, polyurethane, or combinations thereof. The most preferred elastomeric membranes are those made from silicone rubber.

In some preferred embodiments, step (c) of the process is carried out by: (1) purging the permeate zone with inert gas; or by (2) evacuating the permeate zone; or by (3) purging the permeate zone with inert gas and evacuating the permeate zone.

In some preferred embodiments, the ozone-enriched gas product removed from the permeate zone in step (c) contacts a fluid stream containing ozone-reactive substances downstream of the permeate zone.

In other preferred embodiments, step (c) of the process comprises contacting the ozone-enriched gas with a gas stream containing at least one ozone-reactive substance in the permeate zone.

The process of the invention is particularly useful for treating fluids containing at least one ozone-reactive substance comprising hydrogen, carbon monoxide, nitrogen compounds, sulfur compounds, organic compounds, microbiological agents or mixtures thereof downstream from the permeate zone.

In some embodiments, the fluid stream being treated is a liquid stream, such as an aqueous stream. The invention is particularly useful for treating drinking water or wastewater. In these embodiments, the ozone-reactive substance contained in the liquid generally comprises organic compounds, viruses, living organisms or mixtures thereof.

In other embodiments, the fluid stream being treated is a gas stream, such as air, a breathable gas or an exhaust gas from a combustion process.

In any of the embodiments of the invention in which a gas stream is contacted with ozone-enriched gas, the ozone-reactive substance contained in the gas stream generally comprises hydrogen, carbon monoxide, organic compounds, such as lower hydrocarbons, nitrogen compounds, sulfur compounds, microbiological agents or mixtures thereof. Often, the gas stream contains one or more ozone-reactive substances comprising $C_1$–$C_3$ hydrocarbons, nitrogen oxides, sulfur dioxide, hydrogen sulfide, viruses, living organisms or mixtures thereof.

In preferred embodiments, the ozone removed from the permeate zone is contacted with the fluid stream in a venturi device. In more preferred embodiments, step (c) is carried out by (2) or (3), and the evacuating is effected by means of the venturi device.

In preferred embodiments, step (c) is carried out by (1) or (3) and the purge gas is comprised predominantly of nitrogen, carbon dioxide, argon or mixtures thereof.

In other preferred embodiments, one or both of the feed gas and the gas separation means is chilled by vaporizing liquid oxygen. In these preferred embodiments, the vaporized oxygen is preferably used as feed to an ozone generator which produces the gas mixture. In more preferred embodiments, the process further comprises recycling the oxygen-enriched gas removed from the feed zone in step (b) to the ozone generator. In still more preferred embodiments, the process further comprises removing gaseous impurities from the oxygen-enriched gas prior to recycling it to the ozone generator.

According to a second broad embodiment, the invention comprises apparatus for mixing a fluid with a gas comprising:

(a) gas separation means having a gas mixture inlet, a first separated gas outlet and a second separated gas outlet, the gas separation means being adapted to separate a gas mixture introduced thereinto through the gas mixture inlet into a first separated gas and a second separated gas and to discharge the first separated gas through the first separated gas outlet and the second separated gas through the second separated gas outlet;

(b) a carrier fluid-first separated gas mixing device having a carrier fluid inlet, a first separated gas inlet, a mixture outlet and a venturi connected to the carrier fluid inlet, the first separated gas inlet and the mixture outlet, the mixing device being adapted to cause a stream of carrier fluid passing through the venturi at superatmospheric pressure to draw first separated gas into the carrier fluid and discharge carrier fluid-first separated gas mixture from the mixing device through the mixture outlet;

(c) first fluid flow means connecting the first separated gas outlet of the gas separation means to the first separated gas inlet of the mixing device; and (d) second fluid flow means adapted to provide a carrier fluid to the carrier fluid inlet of the gas mixing device at superatmospheric pressure.

In a preferred apparatus embodiment, the gas mixture comprises ozone and oxygen, the first separated gas is ozone-enriched gas, the second separated gas is oxygen-enriched gas and the carrier fluid is a liquid or gas containing ozone-reactable substances.

In another preferred apparatus embodiment, the gas separation means comprises an ozone-permeable membrane.

In another preferred apparatus embodiment, the ozone-permeable membrane is comprised of an elastomeric polymer, silica or combinations thereof.

In another preferred embodiment, the apparatus further comprises third fluid flow means connecting a source of ozone-oxygen gas mixture to the gas mixture inlet of the gas separation means, and the third fluid flow means includes heat exchange means adapted to cool the gas mixture.

In another preferred apparatus embodiment, the heat exchange means comprises a liquid oxygen evaporator having a liquid oxygen inlet, a gaseous oxygen outlet, an ozone-oxygen gas mixture inlet connected to a source of ozone-oxygen gas mixture and a cooled ozone-oxygen gas mixture outlet connected to the first conduit means gas mixture inlet of the gas separation means. In this preferred embodiment, the source of ozone-oxygen gas mixture preferably comprises an ozone generator having an oxygen feed gas inlet and an ozone-oxygen gas mixture outlet; and the apparatus further comprises fourth fluid flow means connecting a source of liquid oxygen to the liquid oxygen inlet of the evaporator; fifth fluid flow means connecting the gaseous oxygen outlet of the evaporator to the oxygen feed gas inlet of the ozone generator; and the ozone-oxygen gas mixture outlet of the evaporator is connected to the gas mixture inlet of the gas separation means.

In another preferred embodiment, the apparatus further comprises sixth fluid flow means connecting the second separated gas outlet of the gas separation means to the ozone generator.

In any of the above apparatus embodiments, the ozone-permeable membrane preferably comprises silicone-based polymers, ethylene-propylene terpolymer; fluorocarbon elastomer, polyurethane or combinations thereof. In the most preferred embodiment, the ozone-permeable membrane comprises silicone rubber.

BRIEF DESCRIPTION OF THE DRAWING

FIG. 1 is a schematic representation of a system in which the process of the invention is carried out.

Only those valves, lines and equipment necessary for an understanding of the invention have been included in the drawing.

DETAILED DESCRIPTION OF THE INVENTION

The invention can be used to more economically and more efficiently produce ozone gas product streams having very high ozone concentrations. This is accomplished by contacting an ozone-oxygen gas with an ozone-selective membrane comprised of an elastomeric polymer, silica or combinations thereof, thereby producing an ozone enriched gas on the permeate side of the membrane and an oxygen-enriched gas on the feed or retentate side of the membrane, and removing the ozone-enriched gas from the permeate side of the membrane.

Membranes made from elastomers and/or silica have good ozone selectivity at ambient temperatures and are particularly effective at low temperatures because of the increased ozone-selectivity of the membranes at low temperatures. Elastomeric polymers are particularly useful because they remain in the rubbery state at very low temperatures due to the fact that they have low $T_g$'s (glass transition temperatures). Preferred elastomeric polymer-based membranes for use in the invention are those made from silicone-based polymers, such as silicone rubber (polydimethylsiloxane); ethylene-propylene terpolymer; fluorocarbon elastomer, polyurethane, or combinations thereof. The most preferred elastomeric membranes are those made from silicone rubber.

The invention can be more easily understood by reference to the appended drawing. Illustrated therein is a system for concentrating an ozone-enriched gas and purifying a fluid stream by means of the ozone-enriched gas. The system illustrated in the drawing comprises a liquid oxygen evaporator, E, an ozone generator, G, an ozone separator, S, a venturi device, V and an oxygen purification plant, P; however, the ozone generator, venturi device and oxygen purification plant are not required in the broad embodiment of the invention. All of these equipment units are conventional and their construction and operation form no part of the invention.

Oxygen evaporator E can be any liquid vaporization equipment that is equipped with means for cooling a fluid by vaporization of liquid coolant without direct contact between the vaporizing liquid and the fluid being cooled. Evaporator E is provided with cooling coil 2. Liquid oxygen inlet line 4 connects a source of liquid oxygen to the liquid oxygen inlet of evaporator E, and evaporated oxygen line 6 joins the oxygen outlet of evaporator E to the suction end of pump 8. The discharge end of pump 8 is connected to the ozonization fluid inlet of ozone generator G via line 10.

Ozone generator G can be any type of oxygen ozonizer, such as an electrical corona discharge generator. Line 12 connects the ozone gas outlet of ozone generator G to the ozone gas inlet of cooling coil 2 of evaporator E, and line 14 connects the outlet end of cooling coil 2 to the ozone-oxygen feed gas inlet of separator S. Alternatively, pump means 8 or additional gas pumping means can be positioned in line 12 or in any other appropriate part of the system.

Separator S contains membrane device 16, which divides the separator into two chambers: feed chamber 18 and permeate chamber 20. Separator S is desirable insulated and/or equipped cooling means to facilitate maintaining it at the desired ozone separation temperature. In the embodiment shown in the drawing, separator S is positioned in insulated cold box 22, which is designed for the vaporization of liquid coolant therein. Oxygen vaporized in cold box 22 can be subsequently used as feed to ozone generator G.

Membrane 16 may be of any desired construction, for example it may be in the form of a flat sheet (as depicted in the appended drawing), and may comprise a single layer or have a composite construction comprising, for example, a substrate layer and a top layer of one or more of the above described ozone-selective elastomers. Furthermore, the membrane may be in the form of bundles of tubes or hollow fibers packed, for example, in a hollow shell module. In the latter case, it is preferred that the ozone-containing gas be passed through the fibers, such that the interior portions of the tubes or hollow fibers constitute feed chamber 18 and the shell side of the bundles constitutes permeate chamber 20 of separator S. The particular details of design and construction of the membrane are a matter of choice and form no part of this invention.

As more fully described below, separator S can serve to simply separate an ozone-enriched gas from the ozone-oxygen feed gas for subsequent use in purifying fluid streams, or it can be used to separate ozone from the feed gas and to treat an ozone-reactive impurity-containing gas by contacting the separated ozone-enriched gas with the impurity-containing gas in permeate chamber 20.

The downstream end of feed chamber 18 is connected to oxygen-enriched gas discharge line 24. Line 24 is connected to the inlet end of oxygen purifier P. Purifier P is optional in the system and, when included, may comprise one or more gas purification units. Purifier P serves to remove gaseous or other impurities which pass through membrane 16 in the reverse direction from chamber 20. Typical purification equipment includes a gas drying unit, such as a desiccant-containing unit, nitrogen and/or argon separators, such as adsorption and/or membrane separation units, and other separation devices that can remove gaseous or vaporized impurities from the system.

Line 26 connects the purified oxygen outlet end of purifier P to discharge line 28, which is fitted with shutoff valve 30 and which may be vented to the atmosphere or connected to downstream plants. Line 26 is also connected to oxygen recycle line 32, which is provided with shutoff valve 34, and which, on its downstream end, is connected to evaporated oxygen line 6. In an alternative arrangement, line 28 is connected to line 24, at a point upstream of purifier P. Line 36 connects the impurity discharge outlet of purifier P to an atmospheric vent or to downstream disposal means.

Liquid oxygen coolant line 38, provided with shutoff valve 40, provides liquid oxygen from line 4 to the coolant inlet end of cold box 22, and line 42, provided with shutoff valve 44, connects the coolant outlet end of cold box 22 to line 32, downstream of valve 34.

Permeate chamber 20 is provided with gas feed line 46, which is fitted with shutoff valve 48, and discharge line 50. The downstream end of line 50 is connected to treated gas discharge line 52, which is provided with shutoff valve 54, and to ozone-enriched gas line 56, which is provided with shutoff valve 58. The downstream end of line 56 is connected to the suction end of venturi device V. Fluid supply line 60 is connected to the high pressure fluid inlet of venturi device V and treated fluid disposal line 62 is connected to the discharge end of venturi device V.

Venturi device V may be any fluid mixing device which operates by passing a first fluid through a venturi chamber to create a low pressure zone, which serves to draw a second fluid into the venturi for mixing with the first fluid downstream of the venturi chamber. Typical venturi devices include eductors and ejectors.

In a preferred procedure for practicing the invention in the system illustrated in the appended drawing, valves 34 and 58 are open and all other valves are closed. Liquid oxygen is introduced into evaporator E through line 4. As the oxygen passes through evaporator E, it vaporizes and cools gas flowing through cooling coil 2. The vaporized oxygen is drawn from evaporator E through line 6 by pump means 8, which may be any suitable gas pumping means, such as a blower, compressor or vacuum pump. The gaseous oxygen enters ozone generator G through line 10. The oxygen supplied to ozone generator G may be at any desired pressure, but is generally at a pressure in the range of about atmospheric pressure to about 20 bara (bar, absolute).

As the feed gas passes through ozone generator G, a portion of the oxygen contained in the gas is converted to ozone by, for example, exposing the feed gas to an electrical corona discharge. The ozone-containing product gas, which may contain as much as 10% by weight or more of ozone, exits ozone generator G through line 12 and enters cooling coil 2 of evaporator E. As the ozone-containing gas passes through cooling coil 2 it is cooled to the desired separation temperature and introduced into feed chamber 18 of separator S. The feed gas passes through chamber 18, and as it does so, an ozone-enriched gas stream permeates through membrane 16 and passes into permeate chamber 20.

If the feed gas is supplied at atmospheric pressure it may be desirable or necessary to maintain the pressure in chamber 18 at subatmospheric pressure to draw feed gas into this chamber 18 at a suitable rate. The pressure in chamber 18 is generally maintained in the range of about 0.8 bara to about 20 bara, is preferably maintained in the range of about 1 to about 10 bara and is more preferably maintained in the range of about 1.5 to about 5 bara. The pressure of the gas in chamber 18 is maintained at the desired level by means of gas pumping means 8. It is generally desirable to maintain the pressure in chamber 20 below the pressure in chamber 18 to enhance permeation of ozone through membrane 16.

During the separation process, separator S can be maintained at any desired temperature, but is generally maintained in the range of about −120 to about 100° C. As noted above, the ozone selectivity of the above-described membranes increases significantly as the permeation temperature decreases; accordingly, it is preferred that the temperature at which permeation of the ozone-enriched gas through membrane 16 takes place be in the range of about −100 to about 0° C., and it is most preferred that the permeation process be carried out at a temperature in the range of about −80 to about −30° C. In this embodiment, separator S is maintained at the desired temperature by cooling the gas passing through cooling coil 2 sufficiently to accomplish this. Insulated cold box 22 helps to maintain separator S at the desired temperature.

The relative concentration of ozone and oxygen in the gas permeating through membrane 16 will depend, inter alia, upon the selectivity of membrane 16, which varies from one membrane to another, and the temperature maintained in separator S. Ideally, substantially all of the ozone in the product gas passes through membrane 16, so that the gas reaching the outlet end of chamber 18 is oxygen-enriched and substantially ozone-free. The oxygen-enriched gas leaves chamber 18 through line 24 and enters purifier P, when this plant is included in the system. Nitrogen, water vapor and/or other impurities that may have infiltrated into the oxygen-enriched gas are removed therefrom in purifier P by the above-described well-know techniques, and discharged from the system through line 36. The purified effluent leaving purifier P through line 26 preferably has substantially the same oxygen concentration as the feed gas entering the system through line 4, and it is combined with the evaporated oxygen feed gas in line 6 for reintroduction into ozone generator G.

If it is desired to discharge part or all of the oxygen-enriched gas leaving purifier P from the system, valve 30 can be opened. In this case, valve 34 can remain open, if it is desired to recycle some of the oxygen-rich gas to generator G, or it can be closed, if it is desired to discharge all of the oxygen-enriched gas from the system. Venting may be preferred to prevent the buildup of impurities in the system, if purifier P is not included in the system, or if purifier P does not remove substantially all of the impurities contained in the oxygen-enriched gas. The vented oxygen-enriched gas can be discharged to the atmosphere or used in downstream oxygen-consuming processes.

In an alternative arrangement, valves 40 and 44 are opened and liquid oxygen is introduced into cold box 22 to help maintain separator S at the desired low temperature. The liquid oxygen vaporizes in cold box 22, and gaseous oxygen is withdrawn from the cold box through lines 42, 26 and 6 by pump means 8, and pumped into ozone generator G through line 10. In another alternative, evaporator E is not in service or not included in the system, and the total refrigeration duty required to maintain separator S at the desired temperature is provided by introducing liquid oxygen into cold box 22 through line 38 and vaporizing the liquid oxygen in cold box 22.

In preferred embodiments of the invention, the ozone-enriched gas produced in separator S is intended for use in an application remote from separator S. In these embodiments, separator S serves simply as a separator to separate an ozone-enriched gas from the feed gas entering chamber 18, and the ozone-enriched gas is continuously removed from permeate chamber 20. This is preferably accomplished by evacuating chamber 20 by means of suitable vacuum-producing means positioned, for example, in line 56. The evacuated ozone-enriched gas can be sent to storage or it can be directly used in an application. In the arrangement illustrated in the drawing, venturi device V serves to both evacuate chamber 20 and mix the evacuated ozone-enriched gas with a fluid that contains ozone-reactable substances. In a preferred aspect of this arrangement, valve 58 is open and valves 48 and 54 are closed. Venturi V is operated by introducing a liquid or gaseous stream which contains one or more ozone-reactable impurities into the venturi through line 60. As the fluid passes through the venturi chamber, it develops a low pressure zone in the region where line 56 is attached to the venturi. The low pressure zone draws ozone-enriched gas from chamber 20 and into the venturi through line 56. The pressure of the fluid passing through line 60 is maintained sufficiently high to develop the desired vacuum. The ozone-enriched gas and the fluid to be treated are mixed thoroughly by the turbulence created by the venturi effect, and the ozone in the mixture destroys the reactable impurities or renders them harmless. The treated fluid passes out of the venturi device through line 62 and is discharged from the system.

In a variation of the above embodiment, valves 48 and 58 are open and valve 54 is closed, and chamber 20 is purged with an inert gas, introduced into chamber 20 through line 46. As used herein, the term "inert gas" means a gas that is substantially free of any components which react with ozone or which renders the ozone gas mixture unsuitable for its intended purpose. Suitable inert gases include nitrogen, argon, carbon dioxide, oxygen, etc. and mixtures of these. A preferred inert gas is nitrogen. In this embodiment, the purge gas-ozone-enriched gas mixture is evacuated from chamber 20 by venturi V or by other suitable gas pumping means. When line 56 is connected to the venturi system, as illustrated in the drawing, the inert gas-ozone-enriched gas mixture is mixed with the treatment fluid entering venturi V through line 60, in the manner described above. This embodiment is useful when it is desired to dilute the ozone-enriched gas with inert gas.

In an alternative arrangement, valve 48 and 54 are open and valve 58 is closed, and permeate chamber 20 is purged with inert gas, introduced into chamber 20 through line 46. In this embodiment, ozone-enriched gas is swept from chamber 20 by the purge gas, and the purge gas-ozoneenriched gas mixture passes out of the system through line 52 and is sent to a downstream application or storage.

In a variation of the above arrangement, valves 48 and 54 are open and valve 58 is closed and the inert gas is replaced with a gas which contains ozone-reactable substances that are to be destroyed or rendered harmless. In this case, separator S also serves as a reactor. Ozone passing through membrane 16 reacts with the ozone reactable substances in chamber 20, and the treated gas mixture passes out of the system through line 54.

Ozone-reactive substances that can be destroyed or rendered harmless by the liquid or gas purification embodiments of the invention include hydrogen, carbon monoxide, nitrogen compounds, sulfur compounds, organic compounds, microbiological agents etc. and mixtures of these. Treatable impurities contained in liquid streams, such as waste water streams, drinking water and semiconductor wafer cleaning liquids, generally include organic compounds and microbiological agents, such as viruses, living organisms, e. g., bacteria, protozoa, fungi, parasites, etc. Treatable impurities found in gas streams, such as combustion gases, atmospheric air, e. g., hospital and office air, and breathing gases, such as oxygen-nitrogen and oxygen-helium mixtures and medical oxygen, include hydrogen, carbon monoxide, organic compounds, such as hydrocarbons, nitrogen compounds, sulfur compounds, microbiological agents or mixtures thereof. Typically, these gases contain lower hydrocarbons, i. e., hydrocarbons having 1 to 6 carbon atoms, such as methane, acetylene, propylene, etc.; nitrogen oxides, such as nitric oxide, nitrogen dioxide, etc.; sulfur compounds, such as sulfur dioxide, hydrogen sulfide, etc.; viruses; living organisms; etc.; and mixtures of these.

In some cases, it may be desirable or necessary to further treat the fluid stream being purified with ozone. This is the case when the ozone-reactable substances present in the fluid include nitrogen oxides and sulfur oxides. The nitrogen oxides and sulfur oxides are oxidized to compounds having a higher oxidation state, such as $N_2O_5$ and $SO_3$, which are converted to nitric acid and sulfuric acid, respectively, upon contact with water. These acids can be scrubbed from the system or easily converted to harmless salts by reaction with basic substances.

It can be appreciated that in the embodiments in which inert gas or an ozone-reactable substance-containing gas stream is passed through chamber 20, some inert gas or gaseous reaction products may permeate through membrane 16 from chamber 20 to chamber 18 due to the lower partial pressure of these components in chamber 18, relative to that in chamber 20. Components that do permeate through membrane 16 can be removed from the oxygen-enriched gas passing through line 24, if desired or necessary, by including appropriate gas removal systems in purifier P, as described above.

It will be appreciated that it is within the scope of the present invention to utilize conventional equipment to monitor and automatically regulate the flow of gases within the system so that it can be fully automated to run continuously in an efficient manner.

Although the invention has been described with particular reference to specific equipment arrangements and membranes and to the purification of specific fluids, these features are merely exemplary of the invention and variations are contemplated. The scope of the invention is limited only by the breadth of the appended claims.

What is claimed is:

1. A process comprising the steps:
   (a) introducing a gas mixture comprising ozone and oxygen into the feed zone of gas separation means comprising a feed zone and a permeate zone separated by an ozone-permeable membrane comprising an elastomeric polymer, silica or combinations thereof, thereby permeating an ozone-enriched gas into said permeate zone and producing an oxygen-enriched gas in said feed zone;
   (b) removing said oxygen-enriched gas from said feed zone; and
   (c) removing ozone from said permeate zone.

2. The process of claim 1, wherein step (a) is carried out at a temperature in the range of about −120 to about 100° C. and at a pressure in the range of about 0.8 to about 20 bara.

3. The process of claim 1, wherein step (c) is carried out by: (1) purging said permeate zone with inert gas; (2) evacuating said permeate zone; or (3) purging said permeate zone with inert gas and evacuating said permeate zone.

4. The process of claim 3, further comprising contacting the ozone removed from said permeate zone with a fluid stream containing at least one ozone-reactive substance.

5. The process of claim 4, wherein said at least one ozone-reactive substance comprises hydrogen, carbon monoxide, nitrogen compounds, sulfur compounds, organic compounds, microbiological agents or mixtures thereof.

6. The process of claim 5, wherein said fluid stream is an aqueous stream.

7. The process of claim 6, wherein said aqueous stream is drinking water, wastewater or semiconductor cleaning liquid.

8. The process of claim 5, wherein said fluid stream is a gas stream.

9. The process of claim 8, wherein said gas stream is air, a breathable gas or an exhaust gas from a combustion process.

10. The process of claim 5, wherein said one or more ozone-reactive substances are organic compounds selected from the group consisting of $C_1$–$C_3$ hydrocarbons; nitrogen compounds selected from the group consisting of nitrogen oxides; sulfur compounds selected from the group consisting of sulfur dioxide and hydrogen sulfide; microbiological agents selected from the group consisting of viruses and living organisms; or mixtures thereof.

11. The process of claim 3, wherein step (c) is carried out by (2) or (3), and said removal is effected by means of a venturi device.

12. The process of claim 3, wherein step (c) is carried out by (1) or (3) and said inert gas is comprised predominantly of nitrogen, carbon dioxide, argon or mixtures thereof.

13. The process of claim 1, wherein step (c) is carried out by passing a gas stream containing at least one ozone-reactive substance through said permeate zone.

14. The process of claim 3 or claim 13, wherein step (a) is carried out at a temperature in the range of about −100 to about 0° C.

15. The process of claim 1, wherein said elastomeric polymer comprises silicone-based polymers, ethylene-propylene terpolymer, fluorocarbon elastomer, polyurethane or combinations thereof.

16. The process of claim 15, wherein step (a) is carried out at a pressure in the range of about 0 to about 10 bara.

17. The process of claim 15, wherein step (a) is carried out at a temperature in the range of about −80 to about −30° C.

18. The process of claim 15, wherein said silicone-based polymers comprises silicone rubber.

19. The process of claim 18, wherein step (a) is carried out at a pressure in the range of about 1.5 to about 5 bara.

20. The process of claim 1, further comprising cooling at least one of said gas mixture and said gas separation means by vaporizing liquid oxygen.

21. The process of claim 20, further comprising introducing said vaporizing oxygen to an ozone generator which produces said gas mixture.

22. The process of claim 21, further comprising recycling said oxygen-enriched gas to said ozone generator.

23. The process of claim 22, further comprising removing gaseous impurities from said oxygen-enriched gas prior to recycling it to said ozone generator.

24. Apparatus for mixing a fluid with a gas comprising:
(a) gas separation means having a gas mixture inlet, a first separated gas outlet and a second separated gas outlet, said gas separation means being adapted to separate a gas mixture introduced thereinto through said gas mixture inlet into a first separated gas and a second separated gas and to discharge said first separated gas through said first separated gas outlet and said second separated gas through said second separated gas outlet;
(b) a carrier fluid-first separated gas mixing device having a carrier fluid inlet, a first separated gas inlet, a mixture outlet and a venturi connected to said carrier fluid inlet, said first separated gas inlet and said mixture outlet, said mixing device being adapted to cause a stream of carrier fluid passing through said venturi at superatmospheric pressure to draw first separated gas into said carrier fluid and discharge carrier fluid-first separated gas mixture from said mixing device through said mixture outlet;
(c) first fluid flow means connecting said first separated gas outlet of said gas separation means to said first separated gas inlet of said mixing device; and
(d) second fluid flow means adapted to provide a carrier fluid to said carrier fluid inlet of said gas mixing device at superatmospheric pressure.

25. The apparatus of claim 24, wherein said gas mixture comprises ozone and oxygen, said first separated gas is ozone-enriched gas, said second separated gas is oxygen-enriched gas and said carrier fluid is a liquid or gas containing ozone-reactable substances.

26. The apparatus of claim 25, wherein said gas separation means comprises an ozone-permeable membrane.

27. The apparatus of claim 26, wherein said ozone-permeable membrane is comprised of an elastomeric polymer, silica or combinations thereof.

28. The apparatus of claim 27, further comprising third fluid flow means connecting a source of ozone-oxygen gas mixture to said gas mixture inlet of said gas separation means, said third fluid flow means including heat exchange means adapted to cool said gas mixture.

29. The apparatus of claim 28, wherein said heat exchange means comprises a liquid oxygen evaporator having a liquid oxygen inlet, a gaseous oxygen outlet, an ozone-oxygen gas mixture inlet connected to a source of ozone-oxygen gas mixture and a cooled ozone-oxygen gas mixture outlet connected to said first conduit means gas mixture inlet of said gas separation means.

30. The apparatus of claim 29, wherein said source of ozone-oxygen gas mixture comprises an ozone generator having an oxygen feed gas inlet and an ozone-oxygen gas mixture outlet; and further comprising fourth fluid flow means connecting a source of liquid oxygen to said liquid oxygen inlet of said evaporator; fifth fluid flow means connecting said gaseous oxygen outlet of said evaporator to said oxygen feed gas inlet of said ozone generator; and wherein said ozone-oxygen gas mixture outlet of said evaporator is connected to said gas mixture inlet of said gas separation means.

31. The apparatus of claim 30, further comprising sixth fluid flow means connecting said second separated gas outlet of said gas separation means to said ozone generator.

32. The apparatus of claim 27, wherein said elastomeric polymer comprises silicone-based polymers, ethylene-propylene terpolymer, fluorocarbon elastomer, polyurethane or combinations thereof.

33. The apparatus of claim 32, wherein said silicone-based polymers comprises silicone rubber.

* * * * *